United States Patent Office 3,801,578
Patented Apr. 2, 1974

---

3,801,578
7-[2-HYDROXY - 3 - (N-METHYL-2-HYDROXY-ETHYLAMINO)-PROPYL]-THEOPHYLLINE - 2-(4-CHLOROPHENOXY)-ISOBUTYRATE
Kalman Harsanyi, Dezso Korbonits, Rudolf Szebeni, Gyula Gal, and Laszlo Keller, Budapest, Hungary, assignors to Chinoin Gyogyszer-es Vegyeszeti Termekek, Budapest, Hungary
No Drawing. Filed Sept. 2, 1971, Ser. No. 177,424
Claims priority, application Hungary, Sept. 25, 1970, Ci–1,033
Int. Cl. C07d 57/52
U.S. Cl. 260—253   1 Claim

---

ABSTRACT OF THE DISCLOSURE

A compound of the formula

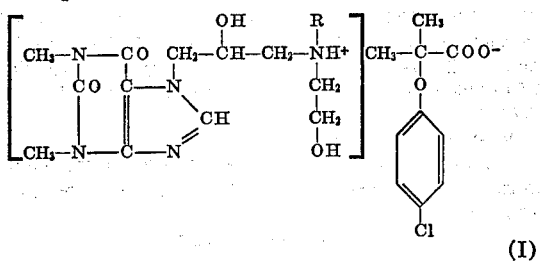

(I)

wherein R is hydrogen or alkyl and a method of making same.

(1) BACKGROUND OF THE INVENTION

Antilipidemic agents play an important role in the treatment and prophylaxis of atherosclerosis. These substances prevent the pathological deposition of lipoproteides on the walls of the blood vessels by reducing the amount of lipoids in the serum. Several fatty acid derivatives having branched carbon chains have been used for the above purpose, among them 2-(4-chlorophenoxy)-isobutyric acid ethyl ester (Clofibrate) proved to be particularly valuable. The above compound effectively reduces the cholesterol, trigylceride and total-lipoid level of the serum.

An other possibility in the treatment of atherosclerosis is to promote the cellular blood flow. In this field favorable experimental and clinical results have been reported in connection with the use of Xanthinonicotinate [Cardiovascular Drug Therapy (New York, 1965), p. 371; Archiv für Kreislaufforschung 49, 14 (1966); Med. Welt 18 (NF) 1648 (1967)]. The preparation of this compound is described in Belgian Pat. No. 571,846, U.S. Pat. No. 2,924,598, German Pat. No. 1,102,750, Belgian Pat. No. 571,848 and Hung. Pat. No. 154,062.

(2) DESCRIPTION OF THE INVENTION

Now we have found that the novel compounds of the Formula I

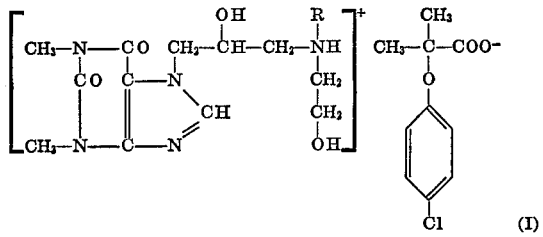

(I)

wherein R represents hydrogen or alkyl—possess antilipidemic and peripheral aneuritic activities; such compounds also control the basic pathological process of atherosclerosis, and compounds exert a favorable influence on disorders of the cellular blood supply. The superposition of these effects is very advantageous in the treatment of atherosclerotic conditions.

This invention relates to novel compounds of the Formula I—wherein R represents hydrogen or alkyl—as well as to a process for the preparation thereof.

The novel compounds of the invention can be prepared by reacting a compound of the Formula II

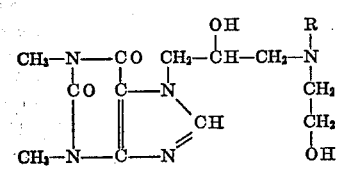

wherein R has meaning indicated above—with 2-(4-chlorophenoxy)-isobutyric acid, and optionally alkylating the thus-obtained compounds of the Formula I wherein R is hydrogen.

The starting substances—i.e. the compound of the Formula II and 2-(4-chlorophenoxy)-izobutyric acid—are reacted preferably in equimolar amounts. The reaction is carried out in the presence of an organic solvent, preferably a lower alkanol. The temperature has no significant influence on the reaction, but it is preferred to carry out the reaction at the boiling point of the mixture. After the reaction is over, the separated product is isolated—e.g. by filtration—and recrystallized from an appropriate solvent, e.g. from methanol.

The compounds of Formula I, wherein R is hydrogen, are alkylated—preferably methylated—in a manner known per se. Methylation is carried out preferably with formaldehyde or with a compound supplying formaldehyde in the course of the reaction, with simultaneous reduction of the compound thus formed.

The starting substances of the Formula II can be prepared by reacting 7-(2,3-epoxypropyl)-theophylline with the appropriate aminoethanol.

The compounds of Formula I, prepared according to the invention are solid, crystalline substances, and can be prepared in high purity. These novel compounds can be converted more readily into pharmaceutical products than the liquid Clofibrate.

The compounds of Formula I can be used in the therapy in the form of pharmaceutical products containing the active ingredient together with inert, nontoxic carriers or diluents. As carriers or diluents, lactose, magnesium stearate, talc, magnesium carbonate etc. can be used. The pharmaceutical products may be in solid form (e.g. tablets, capsules, dragées, suppositories, powder mixtures) or in liquid form, and may contain auxiliary agents (e.g. emulsifying, wetting or suspending agents, filling agents) or other therapeutically valuable substances, if desired.

(3) SPECIFIC DESCRIPTION

The invention is further elucidated with the aid of the following examples.

Example 1

31.13 g. (0.1 moles) of 7-[2-hydroxy-3-(N-methyl-2-hydroxyethylamino)-propyl]-theophylline and 21.46 g. (0.1 mole) of 2-(4-chlorophenoxy)-isobutyric acid are dissolved in 120 ml. of anhydrous ethanol, and the solution is boiled for 1 hour. The mixture is cooled, the separated crystals are isolated by suction filtration and dried. 39 g. (74%) of 7 - [2 - hydroxy-3-(N-methyl-2 - hydroxyethylamino)-propyl]-theophylline - 2 - (4-chlorophenoxy)-isobutyrate are obtained. The product melts at 134–135° C. after recrystallization from isopropanol.

*Analysis.*—Calculated for $C_{23}H_{32}N_5O_7Cl$ (M. wt.: 525.98) (percent): C, 52.51; H, 6.32; N, 13.31; total Cl, 6.74. Found (percent): C, 52.40; H, 6.44; N, 13.61; total Cl, 6.54.

The pharmacological activity of the above compound has been investigated in animal tests. As test animals, dogs were used. 50 mg./kg. doses of the above compound were administered into the limbal arteria of the animals. In 80 percent of the cases the blood flow was increased by 30 to 150 percent, and this effect lasted an average 3 minutes. These results were obtained by measuring the flow with the aid of a flow meter and by means of 133 xenone muscle clearance. The blood pressure of the animals was reduced by 24 percent in average. On normocholesterinaemic rats within 10 days the product lowered the serum cholesterol level by 26.8%, the triglyceride level by 48.6% and the free fatty acid level by 32.6% if administered in a dose of 300 mg./kg. The lowest dose still exhibiting a serum cholesterol and triglyceride level decreasing effect amounted to 300 mg./kg. The product decreases the free fatty acid level of serum if administered in a dose of 30 mg./kg.

Under the effect of subacute treatment with a cholesterol level decreasing dose (300 mg./kg.) the incorporation of the $^{14}C$-acetate into the serum cholesterol fraction is inhibited by 45.4%. This shows that the biosynthesis of cholesterol is inhibited. The lipide decreasing activity may be attributed to this effect.

If administered in a dose of 300 mg./kg. the product decreased the incorporation of $^{14}C$-acetate in the free cholesterol fraction of liver (inhibition 50.1%).

The product exhibits a more express serum fatty acid level decreasing effect than Clofibrate, said effect being contrary to the free fatty level increasing effect of xanthine derivatives particularly that of theophilline. The therapeutical activity of the product is therefore unexpected in view of the chemical structure thereof.

Example 2

A mixture of 23.62 g. (0.1 mole) of 7-(2,3-epoxypropyl)-theophylline, 7.51 g. (0.1 mole) of N-methylaminoethanol and 100 ml. of anhydrous ethanol is boiled for 3 hours; thereafter 21.46 g. (0.1 mole) of 2-(4-chlorophenoxy)-isobutyric acid are added to the mixture. The solution is boiled for 1 hour, thereafter it is cooled, the separated crystals are isolated by suction filtration and dried. 36.2 g. (69%) of 7-[2-hydroxy-3-(N-methyl-2-hydroxyethylamino)-propyl]-theophylline 2-(4-chlorophenoxy)-isobutyrate are obtained; M.P. 132–135° C. (after recrystallization from isopropanol).

Example 3

A mixture of 2.97 g. of 7-[2-hydroxy-3-(2-hydroxyethylamino)-propyl]-theophylline, 2.15 g. of 2(4-chlorophenoxy)-isobutyric acid, 4.6 g. of formic acid and 1.1 g. of a 37% aqueous formaldehyde solution is heated until the components go into solution. In the mean time gas evolution is observed. Heating is interrupted for 10 minutes, whereupon the solution is refluxed for 10 hours. The solution is evaporated in vacuo. The residue is boiled with 30 ml. of anhydrous ethanol for 6 hours, cooled, allowed to stand in a refrigerator for several days, filtered by suction and dried. Thus 4.2 g. of 7-[2-hydroxy-3-(N-methyl - 2 - hydroxyethylamino) - propyl] - theophylline-2-(4-chlorophenoxy)-isobutyrate are obtained. M.P. 135–137° C.

What we claim is:

1. 7-[2-hydroxy - 3 - (N-methyl - 2 - hydroxyethylamino)-propyl]-theophylline-2-(4 - chlorophenoxy)-isobutyrate.

References Cited

Merck Index, 1968, 8th edition, p. 270.
Chem. Abstracts, vol. 60, 1964, 8046f relied on.
Chem. Abstracts, vol. 60, 1964, 8046h relied on.

DONALD G. DAUS, Primary Examiner

A. M. T. TIGHE, Assistant Examiner

U.S. Cl. X.R.

260—256; 424—253